Aug. 11, 1925.
W. G. CALLENDER
LEVER MECHANISM
Filed April 3, 1923
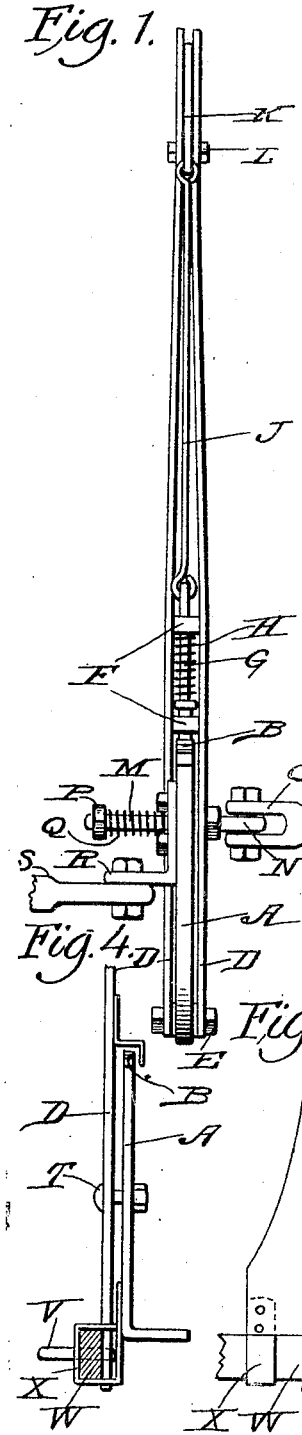
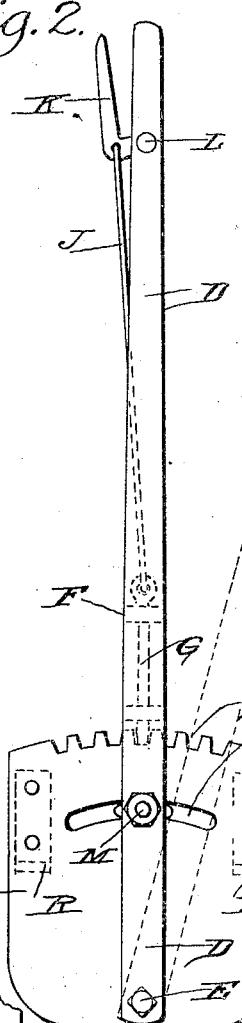
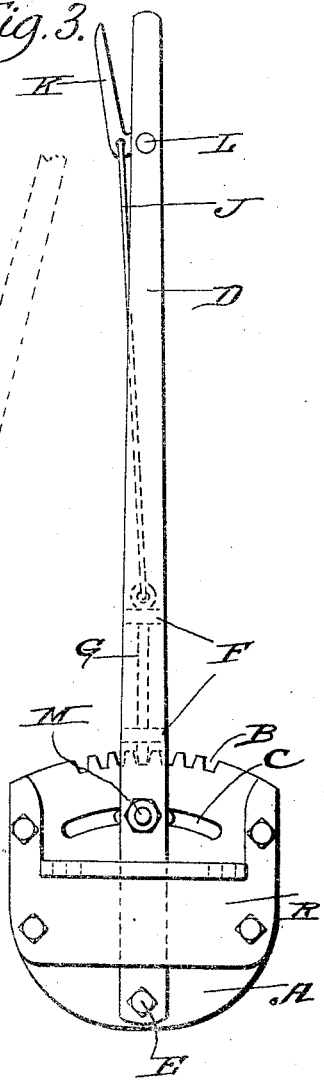
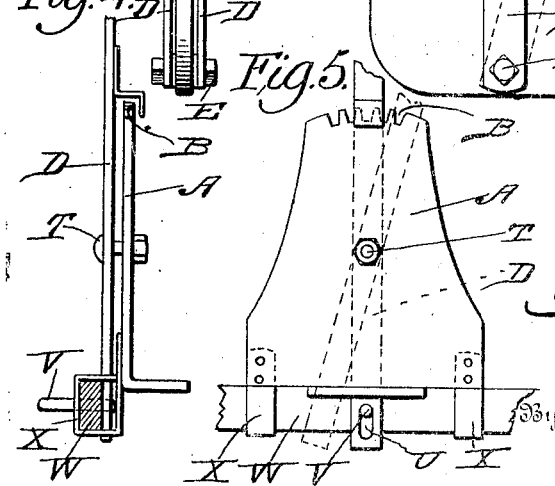
Inventor
Ward G. Callender
By
Attorney Patented Aug. 11, 1925.

1,549,446

UNITED STATES PATENT OFFICE.

WARD G. CALLENDER, OF MANSFIELD, OHIO.

LEVER MECHANISM.

Application filed April 3, 1923. Serial No. 629,628.

*To all whom it may concern:*

Be it known that I, WARD G. CALLENDER, a resident of Mansfield, in the county of Richland and State of Ohio, a citizen of the United States, have invented certain new and useful Improvements in a Lever Mechanism, of which the following is a specification.

My invention relates to improvements in a lever mechanism, which while capable of use in many situations and for various purposes, is particularly adapted for use as a shifting lever for use in connection with a tractor and plow or agricultural implement, for moving the plow or gangs of plows or teeth away from an obstruction.

The main object of my invention is the provision of a shifting lever mechanism which will be of the simplest and most durable construction and which can be operated with ease and facility to cause the implement to clear or avoid an obstruction and which can be manufactured at the right price to commend its use as desirable and practical.

To attain the desired object my invention consists of a shifting lever mechanism embodying novel features of construction and combination of parts for service, substantially as described and claimed, and as shown in the accompanying drawing, in which:

Figure 1 represents a side elevation of a shifting lever mechanism constructed according to my invention in connection with a portion of a plow or agricultural implement and a tractor.

Fig. 2 represents a front view with the lever shown in dotted lines as shifted to one side.

Fig. 3 represents a front view of a slightly modified form of my invention.

Fig. 4 represents an end view of a form of my invention for use with a bar or frame carrying a gang of plows or teeth, and Fig. 5 represents a front view of the same.

My improvements are of extremely simple construction and comprise the vertically disposed plate A, which is rigidly secured in proper position to the frame being provided at its upper edge with the curved or segmental rack B, and with the curved or segmental slot C, said plate being straddled by the twin members D, which form the lever proper, which members are pivoted at their lower ends E, to the plate A, and are provided with guides F, for spring actuated detent G, which is forced by the spring H, into engagement with the rack B, the said detent having its upper end connected by the rod or link J, with the hand operated lever K, which is fulcrumed at L, between the members of the lever and operates to release the detent and permit the lever to be shifted to either side, as shown in dotted lines in Fig. 2.

To the lever is connected the pin M, which passes through the curved slot C, and is formed with an eye N, for connection with the draft portion O, of the plow or other implement, while the other end of the pin projects beyond the plate and carries an adjustable head or nut P, and around the pin and bearing against the plate and nut is a cushioning spring Q, while to the side of the plate opposite the connection with the plow are suitable means R, for connection with the clevis S, of the tractor or draft means.

In the form of my invention shown in Figs. 4 and 5 the shifting lever is fulcrumed to the plate above its lower end as at T, has a slot U, in its lower end which engages a pin V, on a bar W, which carries a gang of plows or teeth, the lever shifting the bar to either side and the bar being guided in the loops X, secured to the plate.

In operation the lever is shifted to either side and moves the plow or gangs of plows away from an obstruction such as a rock or stump avoiding damage to the plow or implement, and the simplicity, durability, cheapness and ease of operation of my device will commend it as a desirable and useful improvement for the purposes intended.

I claim:

The shifting lever mechanism herein shown and described, comprising a plate formed with a rack and a parallel slot, a lever fulcrumed on said plate, a hand controlled spring actuated detent carried by the lever for engaging said rack, a plow or implement connected to the lever at one side, a cushion spring for said connection, and a tractor connected to the plate at its opposite side.

In testimony whereof I hereunto affix my signature.

WARD G. CALLENDER.